(12) United States Patent
Yano

(10) Patent No.: US 6,818,123 B2
(45) Date of Patent: Nov. 16, 2004

(54) WATER CLARIFICATION TREATMENT SYSTEM THROUGH DENITRIFICATION REDUCTION BY FACULTATIVE ANAEROBIC BACTERIA

(76) Inventor: Masao Yano, 10-2-502, Shibayama 3-chome, Funabashi-shi, Chiba, 274-0816 (JP)

(*) Notice: Subject to any disclaimer, the term of this patent is extended or adjusted under 35 U.S.C. 154(b) by 44 days.

(21) Appl. No.: 10/169,770
(22) PCT Filed: Jan. 23, 2001
(86) PCT No.: PCT/JP01/00391
§ 371 (c)(1),
(2), (4) Date: Jul. 22, 2002
(87) PCT Pub. No.: WO01/55038
PCT Pub. Date: Aug. 2, 2001

(65) Prior Publication Data
US 2003/0047496 A1 Mar. 13, 2003

(30) Foreign Application Priority Data
Jan. 25, 2000 (JP) .................. 2000-015712

(51) Int. Cl.⁷ ................ C02F 3/30
(52) U.S. Cl. .......... 210/150; 210/169; 210/196; 210/903
(58) Field of Search .............. 210/150, 151, 210/169, 194, 195, 196, 605, 903; 119/260

(56) References Cited

U.S. PATENT DOCUMENTS

| | | | |
|---|---|---|---|
| 4,179,374 A | * 12/1979 | Savage et al. | 210/196 |
| 4,465,594 A | * 8/1984 | Laak | 210/151 |
| 4,895,645 A | * 1/1990 | Zorich, Jr. | 210/195.1 |
| 4,995,980 A | 2/1991 | Jaubert | |
| 5,006,230 A | * 4/1991 | Votava et al. | 210/151 |
| 5,211,844 A | * 5/1993 | Hattori et al. | 210/151 |
| 5,288,405 A | * 2/1994 | Lamb, III | 210/903 |
| 5,290,451 A | * 3/1994 | Koster et al. | 210/195.1 |
| 5,961,831 A | * 10/1999 | Lee et al. | 210/169 |
| 6,297,033 B1 | * 10/2001 | Van Rijn et al. | 210/150 |

FOREIGN PATENT DOCUMENTS

| | | |
|---|---|---|
| JP | 64-47495 | 2/1989 |
| JP | 1-281198 | 11/1989 |
| JP | 5-277495 | 10/1993 |
| JP | 6-125677 | 5/1994 |
| JP | 11188375 | 7/1999 |
| JP | 2000157096 | 6/2000 |

OTHER PUBLICATIONS

English Language Abstract of JP 1–281198.
English Language Abstract of JP 5–277495.
English Language Abstract of JP 6–125677.
English Language Abstract of JP 11–188375.
English Language Abstract of JP 64–47495.
English Language Abstract of JP 2000–157096.

* cited by examiner

Primary Examiner—Christopher Upton
(74) Attorney, Agent, or Firm—Greenblum & Bernstein, P.L.C.

(57) ABSTRACT

The invention is a water purification system through denitrifying reduction with faculative anaerobes in which a nitrate harmful in the breeding of creatures such as tropical fishes and coral for appreciation and fishes and shellfishes for food and the like is decomposed and denitrifying-reduced in a short time. In this case, an aerobic circulating pathway of water reduced through a filter using aerobes is separately arranged from an anaerobic circulating pathway of water reduced through a closed type anaerobic filter device (10) using anaerobes. A nitrate produced in the aerobic circulating pathway is exuded into the anaerobic circulating pathway through powdery sand (5). This nitrate is decomposed in the anaerobic circulating pathway. A nitrogen gas inside the anaerobic circulating pathway produced in the decomposition of the nitrate is discharged at an isolated state so as not to contact with water in the aerobic circulating pathway.

9 Claims, 9 Drawing Sheets

WATER CLARIFICATION TREATMENT SYSTEM THROUGH DENITRIFICATION REDUCTION BY FACULTATIVE ANAEROBIC BACTERIA

TECHNICAL FIELD

This invention relates to a water purifying system through denitrifying reduction with facultative anaerobes, which is used in an appreciation preserve for breeding aquatic creatures mainly consisting of ornamental fishes such as tropical fishes, freshwater fishes and saltwater fishes, or invertebrata, turtle and the like, or a preserve for breeding edible fishes and shellfishes.

BACKGROUND ART

As this type of the anaerobic water purifying system, there has hitherto been proposed a technique wherein a thick partition including a main reaction space composed of a porous or fibrous substance is formed inside a reaction apparatus between a volume of water to be treated and a volume of water enclosed in a single and means for maintaining concentration gradients of various dissolved substances is arranged in this space to diffuse various microorganisms for purification as is disclosed, for example, in Japanese Patent No. 2665789. And also, there was hitherto been proposed a technique wherein a partition plate provided with many water-passing holes is arranged inside a closed case not permeating a light and food balls as a spherical filtering material including a component growing anaerobic bacteria are filled in one chamber partitioned by the partition plate and a pipe passing water through the chambers formed by the partition plate is attached to control the increase of nitrate included in water in the water tank and decrease the number of water changes.

For example, in the system disclosed in the above Japanese Patent No. 2665789, however, it is inconvenient to take a fairly long times for stabilizing the anaerobic bacteria. Also, a large amount of sand is placed in the water tank, which is appreciatorily indecent, but it is possible to breed corals, few fishes or the like not requiring much food. However, this system do not follow to the decomposition treatment of the nitrate stored day by day, so that it is difficult to breed fishes and corals requiring a greater amount of the food. As a result, the change of water is forcedly conducted, and it is difficult to stabilize water quality and breed a greater number of fishes and the like. Furthermore, there is a circulation type box-like apparatus containing food balls for anaerobes as a conventional technique. However, such a circulation type has problems that the circulating rate approximately equal to dropping does not follow to the decomposition of the nitrate stored day by day in the water tank, and it is difficult to hold a non-oxygen water region as the circulating quantity becomes faster, and the like. Also, it has been confirmed that water filtered through anaerobic circulating water path is returned to aerobic circulating water path to return nitrogen denitrified in the anaerobic circulating water path to water breeding aquatic creatures and this nitrogen component obstructs the growth of invertebrata such as corals, shellfishes and the like. Further, the food balls to be supplied to the anaerobes (organic substance consisting of methanol, methyl alcohol or the like as a main component) melt into the breeding water to whiten the breeding water, which gives a bad influence to the breeding creatures and aerobic filtering bacteria. Moreover, concentrations of ammonia and nitrate are raised to bring about the death of the breeding creatures.

The invention is discovered based on the conventionally existing circumstances as mentioned above and is to provide a water purifying system through denitrifying reduction with facultative anaerobes in which a nitrate harmful in the breeding of creatures such as fish, coral and the like is efficiently decomposed in a short time so as to conduct the denitrifying reduction as compared with the conventional water purifying system with anaerobes and a nitrogen component is separated and removed from water for breeding and the number of water exchange is decreased as far as possible to reduce a purification cost and labor for water exchange.

DISCLOSURE OF THE INVENTION

According to the invention, an aerobic circulating pathway of water reduced through a filter using aerobes and an anaerobic circulating pathway of water reduced through a filter using anaerobes are separately arranged, and a nitrate produced in the aerobic circulating pathway is exuded into the anaerobic circulating pathway through sand or a water-permeable and oxygen-impermeable screen member separating the aerobic circulating pathway and the anaerobic circulating pathway, and the nitrate is decomposed in the anaerobic circulating pathway arranged independently from the aerobic circulating pathway.

Furthermore, a nitrogen gas produced when the nitrate is decomposed in the anaerobic circulating pathway is discharged at a state of isolating so as not to contact with water in the aerobic circulating pathway. And also, the anaerobic circulating pathway is disposed on a bottom or a side face part of a water tank for breeding of aquatic creatures, or on a bottom of a water chamber adjacent to an exterior aerobic filter tank connected to the water tank for breeding the aquatic creatures, or a bottom side of the aerobic filtering tank.

Further, a box type anaerobic bottom filter body constructed by perforating plural holes in an upper plate part so as to render into a draining board, and arranging a pair of shower pipes for drainage and discharge each connected at its opening end side to a closed type anaerobic filter device and provided with plural jetting holes in its longitudinal direction so as to locate in an inside of the filter body at both opposed ends thereof is arranged on a bottom part of the water tank for breeding the aquatic creatures, and powdery sand or the water-permeable and oxygen-impermeable screen member is placed on an upper face of the draining upper plate part of the anaerobic bottom filter body, and water existing inside the anaerobic bottom filter body is circulated through the closed type anaerobic filter device to conduct reducing treatment and contacted with the powdery sand or the screen member located on the upper face of the draining upper plate part through the holes.

In addition, a box type anaerobic bottom filter body constructed by perforating plural holes in an upper plate part so as to render into a draining board, and arranging a pair of shower pipes for drainage and discharge each connected at its opening end side to a closed type anaerobic filter device and provided with plural jetting holes in its longitudinal direction so as to locate in an inside of the filter body at both opposed ends thereof is arranged on an inner bottom part of a water chamber adjacent to the aerobic filtering tank arranged outside the water tank for breeding the aquatic creatures or at a bottom side of the aerobic filtering tank, and powdery sand or the water-permeable and oxygen-impermeable screen member is placed on an upper face of the draining upper plate part of the anaerobic bottom filter body, and water existing inside the anaerobic bottom filter body is circulated through the closed type anaerobic filter device to conduct reducing treatment and contacted with the powdery sand or the screen member located on the upper face of the draining upper plate part through the holes.

Moreover, a pair of shower pipes for drainage and discharge each provided with plural jetting holes in its longitudinal direction so as to locate in an inside of the filter body at both opposed ends thereof is arranged in an inside of a lower-stage chamber formed on an upper face side with punch board at both ends thereof, and powdery sand or a water-permeable and oxygen-impermeable screen member is filled in a middle-stage chamber located between the punch board of the upper face side of the lower-stage chamber and a permeable screen arranged above the punch board, and a unit type reducing filter box of a filtering tank throwing system filled with a rough sponge pad or gravel is arranged inside an upper-stage chamber between the permeable screen and a punch board arranged above the permeable screen.

In the anaerobic circulating pathway is arranged a cylinder type exuding hollow body constructed by covering a pipe provided on its side face with holes with a net-like covering member, and the cylinder type exuding hollow body is disposed in the bottom of the water tank as an anaerobic bottom filter body.

Further, a cylinder type exuding hollow body is formed by covering a pipe provided on its side face with holes with a net-like covering member, and a pair of such cylinder type exuding hollow bodies are arranged on upper and lower sides of a closed box, and powdery sand is filled in the inside of the box to serve the upper cylinder type exuding hollow body as an aerobic circulating pathway and the lower cylinder type exuding hollow body as an anaerobic circulating pathway.

In the anaerobic water purifying system for breeding aquatic creatures having the above construction according to the invention, the nitrate produced in the aerobic filtering tank is decomposed in the anaerobic circulating pathway separated independently from the aerobic circulating pathway of water. By exuding the nitrate from the aerobic circulating pathway to the anaerobic circulating pathway to decompose in the anaerobic circulating pathway separate independently from the aerobic circulating pathway is efficiently denitrified and reduced the nitrate in the water tank in a short time.

BEST MODE FOR CARRYING OUT THE INVENTION

Figure 2:
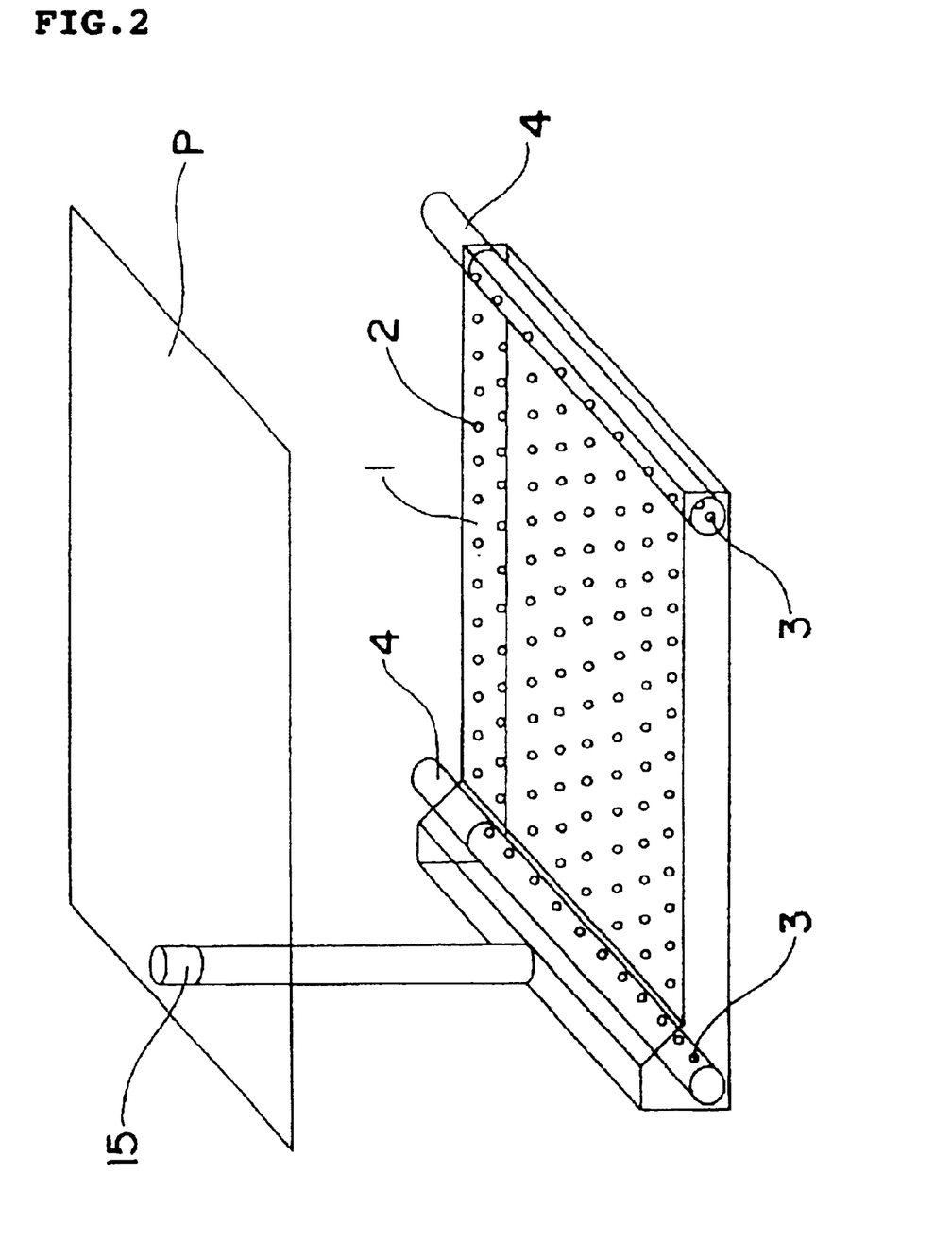
FIG. 2 is a perspective view of a min part of an anaerobic bottom filter body.
Figure 3:
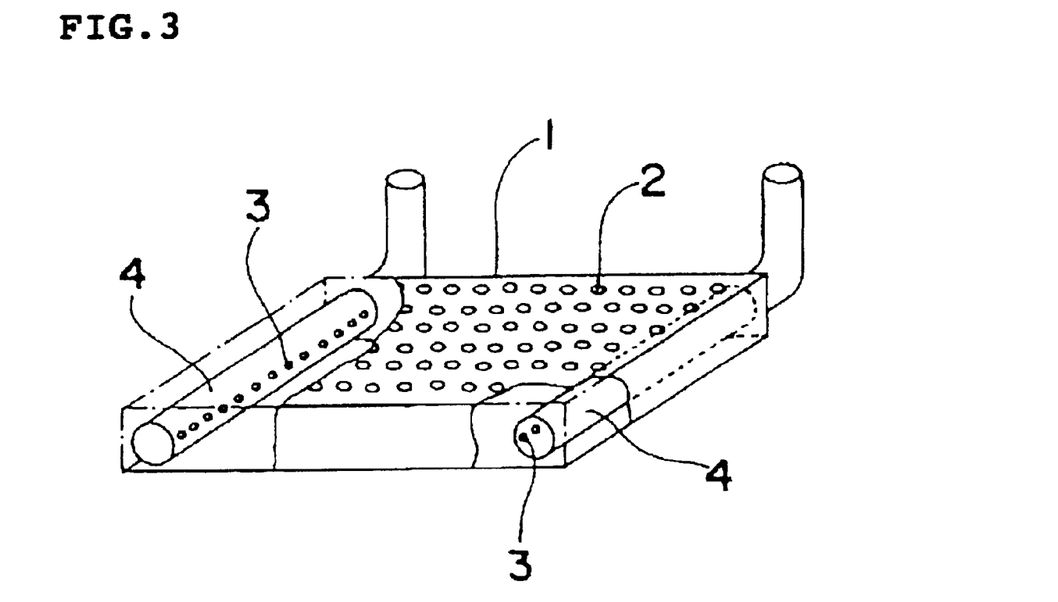
FIG. 3 is a perspective view of an anaerobic bottom filter body.
Figure 4:
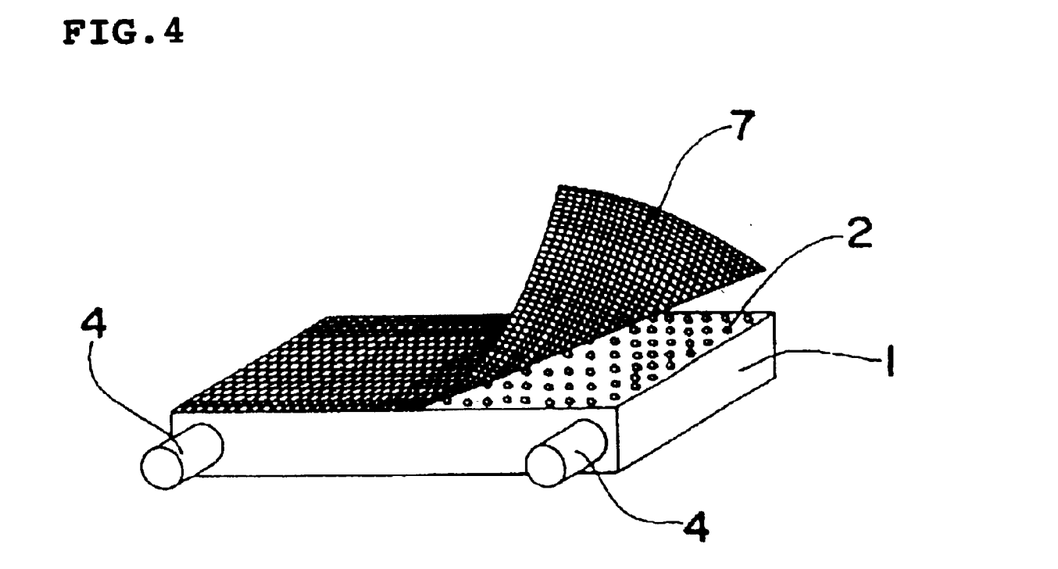
FIG. 4 is a perspective view illustrating a state of mounting a net on the anaerobic bottom filter body.
Figure 5:
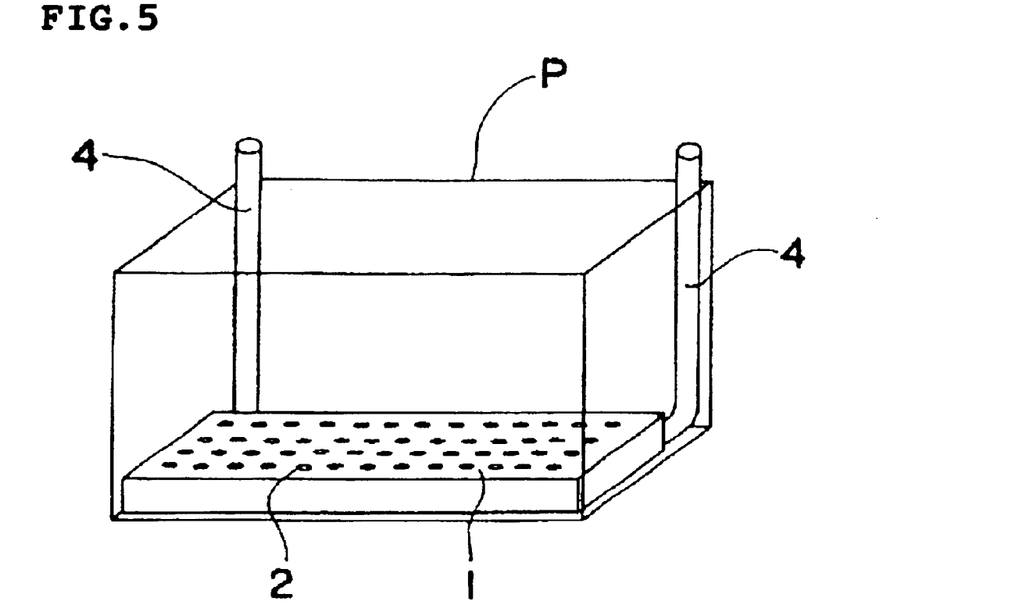
FIG. 5 is a perspective view illustrating a state of the anaerobic bottom filter body onto a water tank.

The invention will be described in detail with reference to the accompanying drawings. In a first embodiment shown in FIGS. 1 to 8, numeral 1 is a one-piece box type anaerobic bottom filter body of a synthetic resin such as acrylic resin, vinyl chloride resin or the like. As shown in FIGS. 2, 3 and 5, the anaerobic bottom filter body 1 is constructed by perforating plural holes 2 in an upper plate side of the box in form of punch board to render into a draining board and arranging a pair of shower pipes 4 for drainage and discharge each connected at its opening end side to a closed type anaerobic filter device 10 and provided with plural jetting holes 3 in its longitudinal direction so as to locate in an inside of the filter body at both opposed ends thereof.

Figure 1:
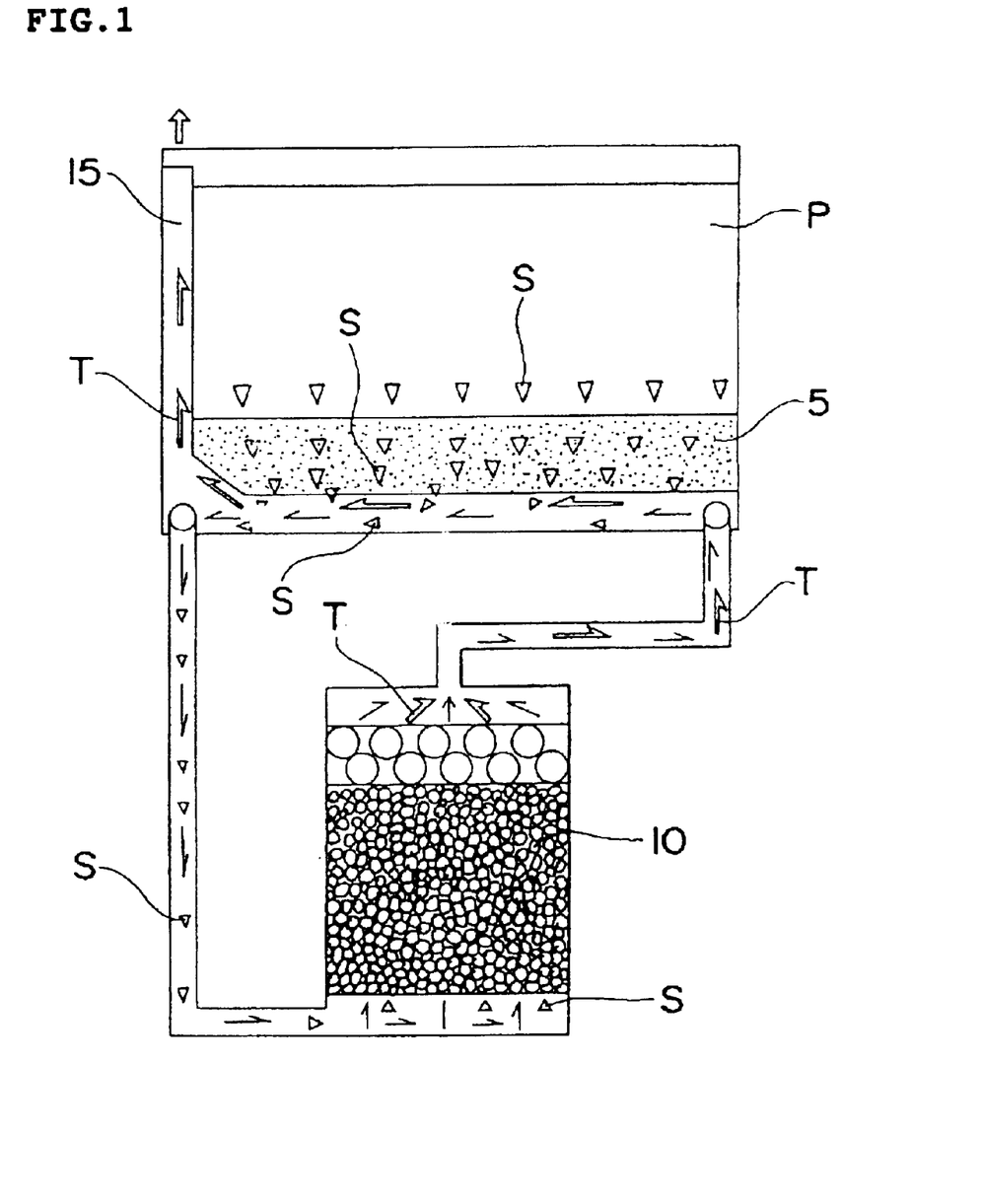
FIG. 1 is a perspective view of a main part of a first embodiment of the system according to the invention.

FIG. 1 shows an outline of the system, wherein a nitrate S inside a water tank P produced in an aerobic circulating pathway is exuded and entered into an anaerobic circulating pathway, and the nitrate S is denitrified and reduced in the anaerobic circulating pathway separated independently from the aerobic circulating pathway. As the anaerobic circulating pathway in the illustrated embodiment is used a closed type anaerobic filter device 10, which is arranged on and contacted with a bottom of the water tank P provided with an arbitrary aerobic filtering tank (not shown) filtering water in the water tank P. In this embodiment, the aerobic circulating pathway and the anaerobic circulating pathway are separated by powdery sand 5 or a penetration film in which the nitrate S in the water tank P is exuded through the powdery sand 5 or the penetration film to the anaerobic circulating pathway. In the anaerobic circulating pathway, the entered nitrate S is decomposed by the closed type anaerobic filter device 10 using the anaerobes and also the propagation of the anaerobes is promoted.

On the other hand, nitrogen gas T produced in the denitrifying reduction of the nitrate S with the anaerobes is discharged out at an isolated state so as not to contact with water in the aerobic circulating pathway (see FIGS. 1 and 2). In the illustrated embodiment, a gas discharge pipe 15 is arranged in the anaerobic circulating pathway to discharge the nitrogen gas T through the gas discharge pipe 15 by utilizing a floating force of the gas. Also, the gas discharge pipe 15 is arranged in the breeding water tank, whereby water level of the breeding water tank can be made equal to water level of the gas discharging pipe to prevent the jetting-out of water from the gas discharge pipe. Further, an organic substance such-as methanol, methyl alcohol or the like may be supplied from a discharge port as an alternate for food ball.

Figure 6:
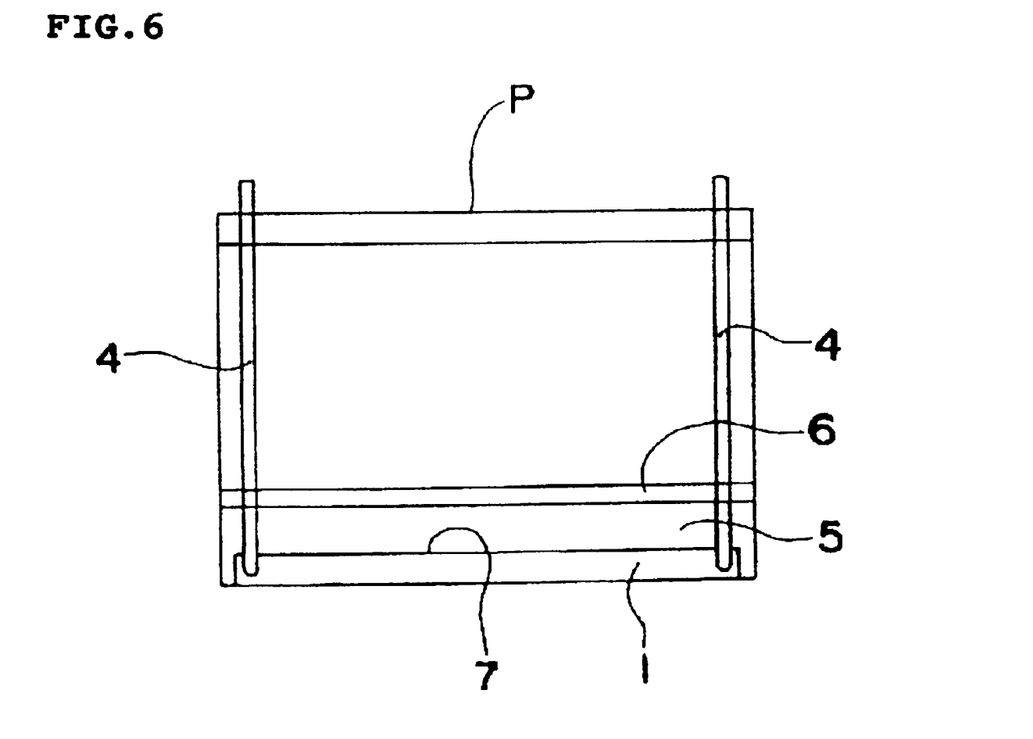
FIG. 6 is a side view illustrating a state of mounting the anaerobic bottom filter body onto the water tank.

As shown in FIGS. 5 and 6, the box type anaerobic bottom filter body 1 is arranged on the bottom portion of the water tank P for breeding aquatic creatures, while a mesh net 7 is placed on an upper face of a draining upper plate part of the anaerobic bottom filter body 1, and powdery sand 5, penetration film or water-permeable and oxygen-impermeable screen member is further placed thereon at a given thickness of about 4 cm and sand 6 having a size more than sesame grain is placed thereon at a thickness of about 1 cm so as to prevent the scattering of the powdery sand 5 in the water tank P through water flow. Thus, water in the anaerobic bottom filter body 1 is sucked into one shower pipe 4 through a pump portion 11 (see FIG. 7) for forced water circulation enclosed in the closed type anaerobic filter device 10 and subjected to reducing treatment in the closed type anaerobic filter device 10 and discharged out through the other shower pipe 4, during which the nitrate is exuded through the holes 2 and the powdery sand 5 or water-permeable and oxygen-impermeable screen member located on the upper face of the draining upper plate part. In this case, the discharge flow amount through the shower pipe 4 is matched with the discharge flow amount through the pump portion 11 of the closed type anaerobic filter device 10. That is, the discharge and sucking flow amounts through the shower pipes 4 are matched with the discharge and sucking flow amounts through the pump portion 11 of the closed type anaerobic filter device 10.

Figure 7:
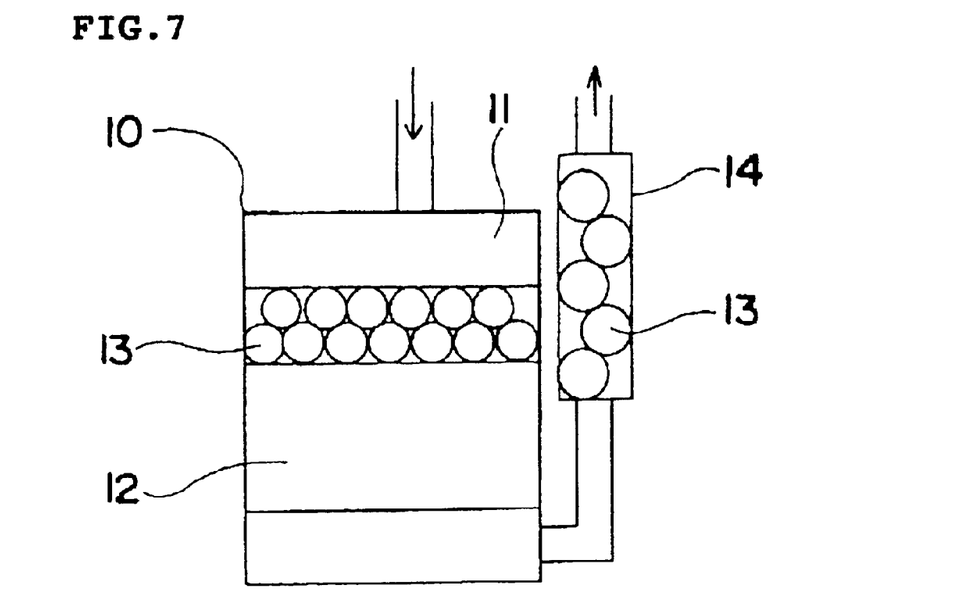
FIG. 7 is a schematic view shown an effect in the first embodiment of the invention.
Figure 8:
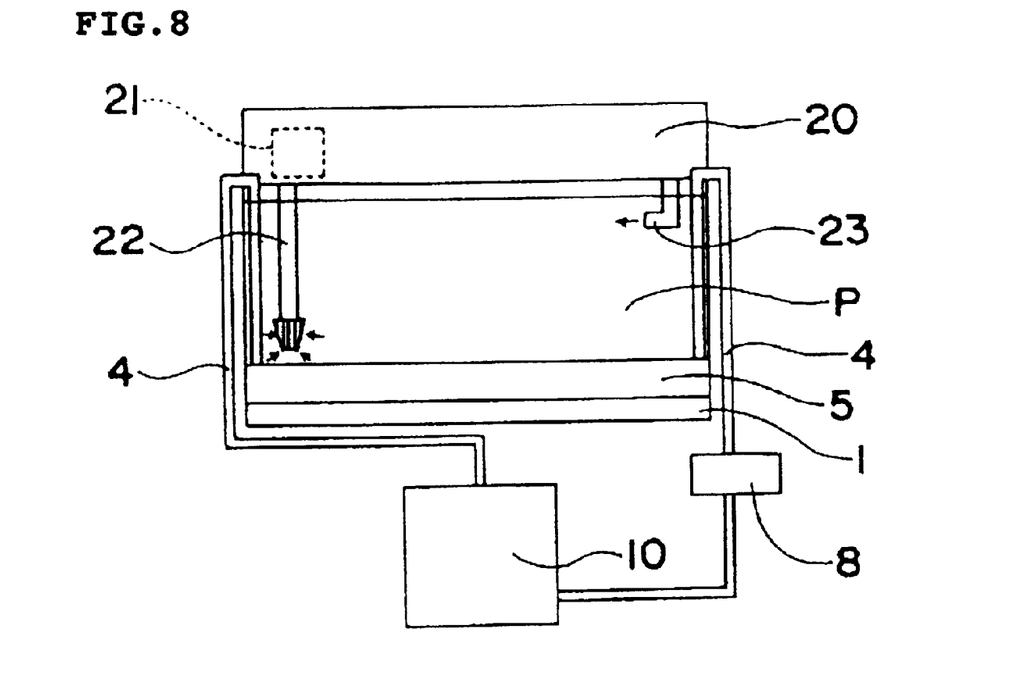
FIG. 8 is a diagrammatically section view of a construction in a closed type anaerobic filter device.

Further, the closed anaerobic filter device 10 has an exterior type closed box structure as shown in FIG. 7, in which bacteria fixing filtering material 12 is first inserted into the box, and food balls 13 for anaerobes are filled as a spherical filtering member and then the pump portion 11 for forced water circulation is placed thereon. In addition, food balls 13 for anaerobes may be filled in a single-purpose box 14 capable of adjusting the amount separated from the closed type anaerobic filter device 10. Moreover, means 8 for checking water flowing amount is arranged between the closed type anaerobic filter device 10 and the anaerobic bottom filter body 1 in FIG. 8. Further, an upper type (surface type) aerobic filter 20 having the same structure as in the conventional one is attached to an upper opening part of the water tank P to define the aerobic circulating pathway.

The upper type (surface type) aerobic filter 20 comprises a pump portion 21 and a pumping conduit 22 for pumping water in the water tank P to filter through the aerobic filter, wherein water in the water tank P is always fed from an inlet port to the filtering device and discharged out from an outlet port 23 after the filtration.

An example of using the first embodiment is explained. At first, a box type anaerobic bottom filter body 1 shown in FIG. 3 is placed and fixed onto a bottom of a water tank P, and then a mesh net 7 is placed on an upper face of a draining upper plate part of the anaerobic bottom filter body 1 and powdery sand 5, penetration film or water-permeable and oxygen-impermeable screen member is placed thereon at a given thickness of about 4 cm and thereafter sand 6 having a size larger than sesame grain is placed thereon at a thickness of about 1 cm so as to prevent the scattering of the powdery sand 5 in the water tank P through water flow. Then, an upper type (surface type) aerobic filter 20 is attached onto an upper opening portion of the water tank P. By actuating the pump portion 11 of the closed type anaerobic filter device 10 and a pumping pump portion 21 of the upper type (surface type) aerobic filter 20 are separated and circulated water exclusive for aerobes and water exclusive for anaerobes to utilize each filtering function at maximum. That is, the water exclusive for anaerobes is obtained by subjecting water in the box type anaerobic bottom filter body 1 to reducing treatment through the closed type anaerobic filter device 10 and circulating through the holes 2, which enters nitrate in the aerobic circulating pathway exuded from the powdery sand 5 or the water-permeable and oxygen-impermeable screen member located on the upper face of the draining upper plate part toward the anaerobic circulating pathway and decompose the nitrate for a short time. Further, when the anaerobic circulating water is circulated, it contacts with the filtering material as a dwelling for anaerobes, so that it is possible to efficiently increase anaerobes.

FIGS. 9 to 13 show the other embodiments.

Figure 9:
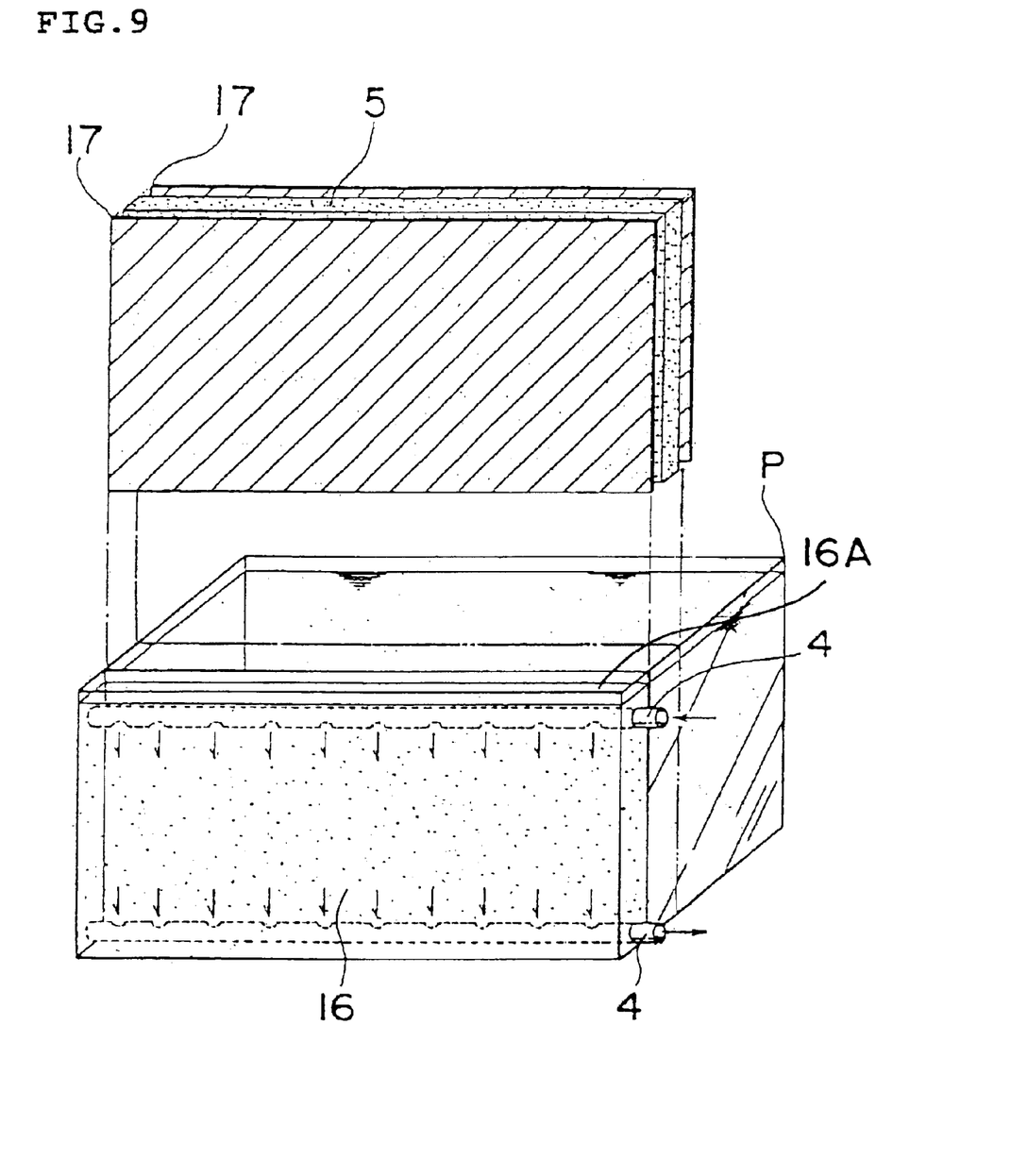
FIG. 9 is an exploded perspective view of a water tank illustrating a state of mounting an anaerobic side face filter body in another embodiment of the invention.

FIG. 9 is an embodiment of mounting an anaerobic filter body 16 for side face onto a rear face portion of a water tank P, in which the water tank P and the anaerobic filter body 16 are separated by sandwiching powdery sand 5 or water-permeable and oxygen-impermeable screen member between net-shaped plates 17. In this embodiment, when anaerobic circulating water reduced through a closed type anaerobic filter device 10 moves from an upper shower pipe 4 to a lower shower pipe 4, a nitrate exuded from an aerobic circulating pathway of the water tank P can be entered into an anaerobic circulating pathway. Moreover, an upper part of the anaerobic filter body 16 is opened to render into a nitrogen discharge port 16A.

Figure 10:
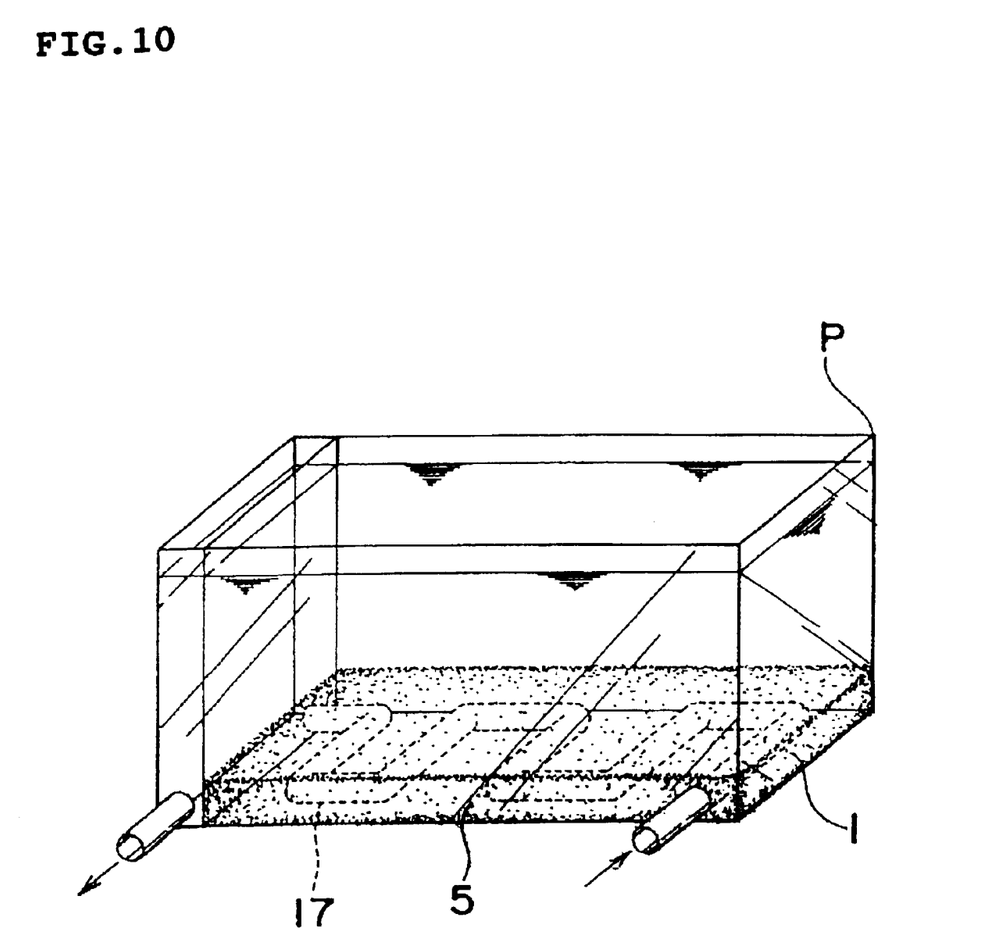
FIG. 10 is a perspective view illustrating a state of mounting an anaerobic bottom filter body provided with a cylinder type exuding hollow body.
Figure 11:
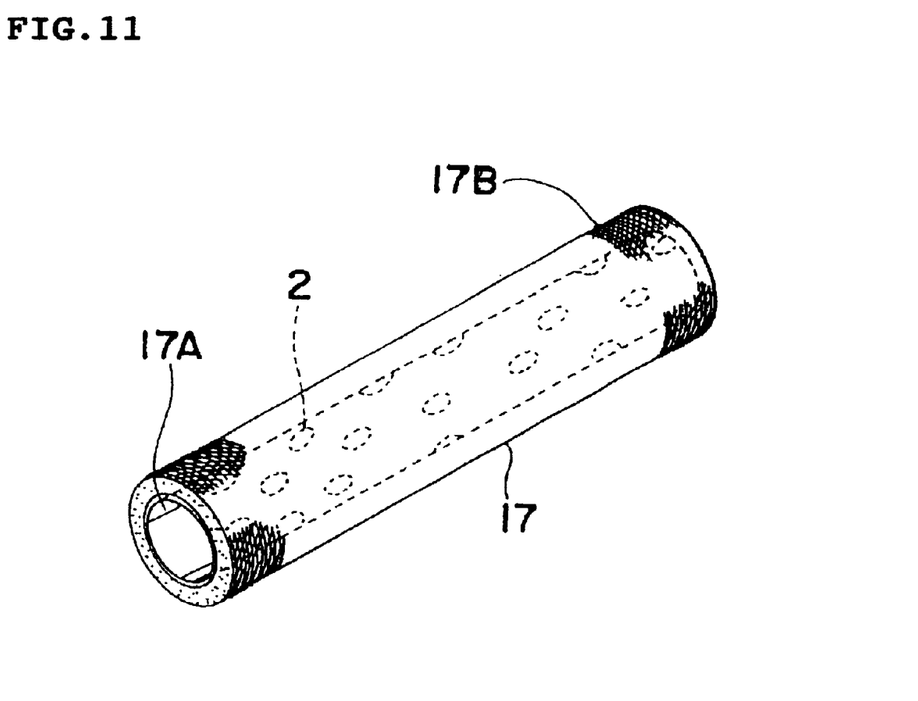
FIG. 11 is a perspective view of a main part of an embodiment of the cylinder type exuding hollow body.

An embodiment shown in FIG. 10 is a case of further improving the anaerobic bottom filter body 1, wherein a cylinder type exuding hollow body 17 formed by applying a net-shaped covering member 17B to a pipe 17A provided on its side face with holes 2 as shown in FIG. 11 is arranged on a bottom of the water tank P as an anaerobic bottom filter body 1. Although a layer of powdery sand 5 is arranged o the cylinder type exuding hollow body 17 in FIG. 10, it is possible to use only the cylinder type exuding hollow body 17 with omitting the layer of powdery sand 5. Moreover, an upper part of a side face of the anaerobic filter body 1 is opened and serves as a nitrogen discharge port 1A.

Figure 12:
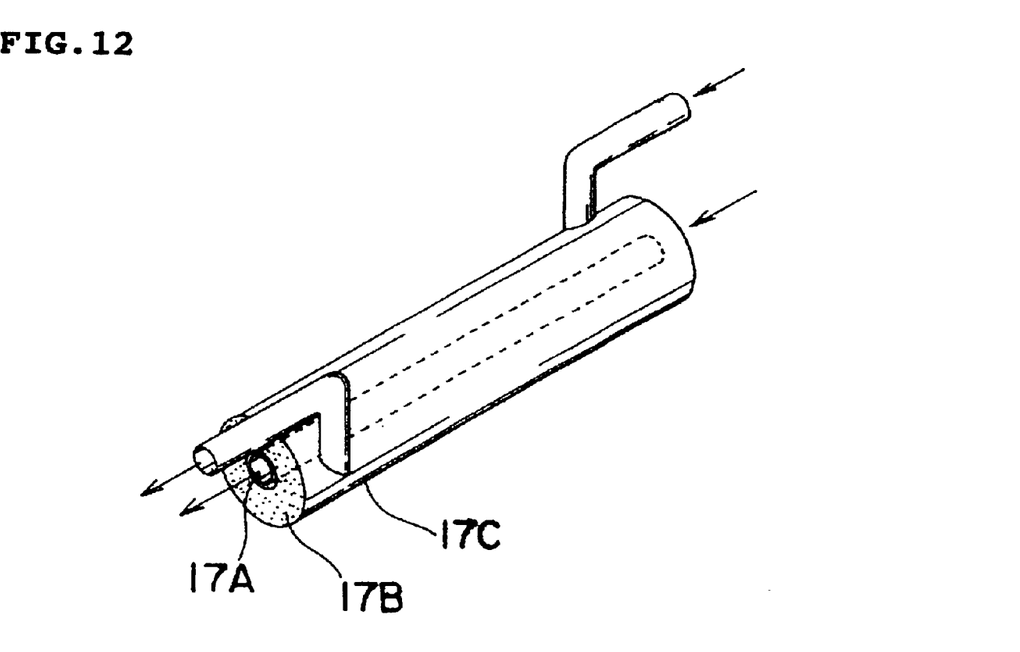
FIG. 12 is a perspective view of another embodiment of the cylinder type exuding hollow body.

An embodiment shown in FIG. 12 shows another example of the cylinder type exuding hollow body 17, wherein the pipe 17A serves as an aerobic circulating pathway, and a waterproof film 17C is arranged outside the covering member 17B to act the covering member 17B as an anaerobic circulating pathway. In this cylinder type exuding hollow body 17, when the anaerobic circulating water is meandered in the inside of the covering member 17B, the nitrate exuded from the aerobic circulating pathway is entered into the anaerobic circulating pathway. And also, a nitrogen discharge port (not shown) is arranged on the anaerobic circulating pathway along a line thereof.

Figure 13:
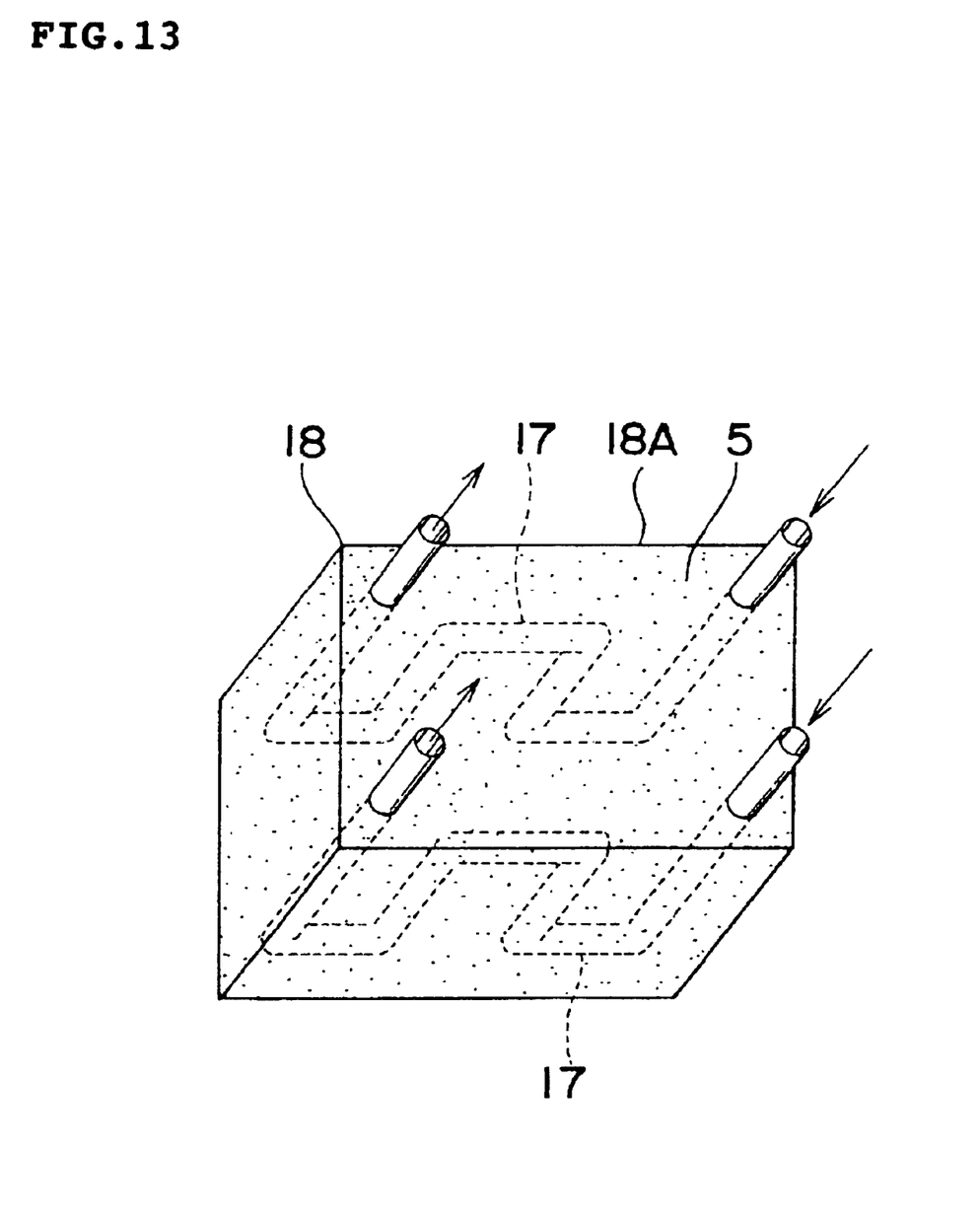
FIG. 13 is a perspective view illustrating an exterior type exuding exchange tank in the other embodiment of the invention.

An embodiment shown in FIG. 13 shows an exterior type exuding exchange tank 18. The exterior type exuding exchange tank 18 is formed by filling powdery sand in an inside of a closed box 18A, and a pair of the cylinder type exuding hollow bodies 17 shown in FIG. 11 are arranged in the box 18 up and down. The upper cylinder type exuding hollow body 17 serves as an aerobic circulating pathway, and the lower cylinder type exuding hollow body 17 serves as an anaerobic circulating pathway. Also, a nitrogen discharge port (not shown) is arranged on the anaerobic circulating pathway along a line thereof.

Then, the first embodiment is described based on the experimental results. An aerobic filtering member is an exterior type wet and dry+upper filter.

Experiment 1

At first, the invention is described with respect to saltwater fishes. In a water tank having a size of 620 mm(W)× 360 mm(D)×450 mm(H) and a water storing quantity of about 70 liters is arranged the anaerobic bottom filter body, and powdery coral sand is placed on the upper face of the draining upper plate part thereof at a thickness of about 4 cm, and further sesame grain-like coral sand is placed thereon at a thickness of about 1 cm. Also, the aerobic filtering member is an exterior type wet and dry+upper filter made by Tetra Corporation. In this case, a non-oxygen state is confirmed after 6 days, so that they are systemized at this thickness without adding sand. Consequently, results as shown in Table 1 are obtained.

TABLE 1

| Day | | 1 | 2 | 3 | 4 | 5 | 6 | 7 | 8 | 10 | 15 | 30 | 50 | 90 | 300 | 720 |
|---|---|---|---|---|---|---|---|---|---|---|---|---|---|---|---|---|
| Data table(1) Saltwater fish | | | | | | | | | | | | | | | | |
| Inside keeping water tank | | | | | | | | | | | | | | | | |
| $NH_{4+}$ Ammonia ion | ppm | 0.25 | 0.5 | 0.25 | 0 | 0 | 0 | 0 | 0 | 0 | 0 | 0 | 0 | 0 | 0 | 0 |
| Nitrite ion $NO_2$ | ppm | 0.05 | 0.2 | 0.2 | 0.1 | 0 | 0.05 | 0 | 0 | 0 | 0 | 0 | 0 | 0 | 0 | 0 |
| Nitrate ion $NO_3$ | ppm | 0 | 0 | 10 | 5 | 2.5 | 2.5 | 2.5 | 0 | 0 | 0 | 0 | 0 | 0 | 0 | 0 |
| Alkali degree PH | unit | 7.8 | 7.7 | 7.6 | 7.6 | 7.5 | 7.8 | 7.8 | 7.9 | 8 | 7.9 | 8 | 8 | 7.9 | 7.9 | 8.2 |
| KH Hardness of carbonate | dKH | 8 | 8 | 9 | 10 | 12 | 15 | 15 | 15 | 14 | 15 | 16 | 15 | 16 | 15 | 16 |
| Oxidation-reduction potential ORP | mvl | 50 | 60 | 60 | 120 | 130 | 150 | 210 | 250 | 240 | 280 | 320 | 340 | 330 | 455 | 445 |
| Calcium ion Ca | ppm | 300 | 300 | 300 | 300 | 300 | 300 | 300 | 320 | 320 | 380 | 400 | 450 | 450 | 550 | 550 |
| Inside anaerobic filter | | | | | | | | | | | | | | | | |
| $O_2$ Saturated amount of dissolved oxygen | mg/l | 14 | 11 | 8 | 5 | 2 | 0 | 0 | 0 | 0 | 0 | 0 | 0 | 0 | 0 | 0 |
| Nitrite ion $NO_2$ | ppm | 0 | 0 | 0 | 0.1 | 0.2 | 0.5 | 0.2 | 0.2 | 0.2 | 0.2 | 0.2 | 0.2 | 0.2 | 0.2 | 0.2 |
| Nitrate ion $NO_3$ | ppm | 0 | 0 | 5 | 10 | 20 | 10 | 10 | 10 | 10 | 10 | 10 | 10 | 10 | 20 | 10 |

That is, about 5 kg of fresh rye blocks gathered from sea as a natural rock are placed in the breeding water tank at a first day of the setting (natural bacteria are existent in the rye blocks), and a filtering member is placed between an exterior type aerobic filter and an exterior type anaerobic filter. Further, commercially available aerobic bacteria and anaerobic bacteria (state of suspended animation after cultivation of natural bacteria) are placed in the respective filters to wait fixed increase of the bacteria to the exclusive filtering material. In this case, the occurrence of ammonia and nitrite is due to the fact that a part of creatures adhered to the rye blocks die out, which is considered that the creature does not meet with a quality of artificial sea water, water salt or the like and is damaged in the transportation. In a third day, aerobic bacteria activates and decomposes ammonia and nitrite to create nitrate. In a fourth day, the nitrate in the breeding water tank penetrates into an anaerobic side to start the lowering of the concentration. In a fifth day, about 100 damselfishes are fed into the water tank to start the observation of the living body. On and after a sixth day, a given amount of food is given twice on morning and night. In a seventh day, nitrate is somewhat generated in the breeding water tank, it is confirmed that ammonia, nitrite and nitrate are not generated on and after an eighth day as observed by a commercially available reagent. Also, small bubbles float up in the inside of the nitrogen discharge pipe any number of times on and after this day to continue the confirmation of denitrifying outside the breeding water tank. As seen from the above, a safe environment for the living of the seawater fishes can be made up for about 1 week.

As seen from Table 1, calcium ion in sea water gradually increases and is stable in sea water.

Experiment 2

Next, the system is the same as in Experiment 1, but 10 damselfishes are used as a starting fish instead of commercially available bacteria. In this case, the starting fish is selected from healthy and cheap fishes such as damselfish or the like for waiting to naturally get bacteria from fish s excrement and causing no problem even if the fish is damaged. The results as shown in Table 2 are obtained. Although the formation of bacteria is required for a time longer by 4 times than the case of Table 1, water quality is stably maintained. In this case, 90 damselfishes are added in a thirty day.

TABLE 2

| Data table(2) Saltwater fish ryeblock bacteria (artificial) starting fish 10 fishes | | | | | | | | | | | | | | | | |
|---|---|---|---|---|---|---|---|---|---|---|---|---|---|---|---|---|
| Day | | 1 | 2 | 3 | 4 | 5 | 6 | 7 | 8 | 10 | 15 | 30 | 50 | 90 | 300 | 720 |
| Inside keeping water tank | | | | | | | | | | | | | | | | |
| $NH_{4+}$ Ammonia ion | ppm | 0 | 0.5 | 2.5 | 2.5 | 1 | 0.5 | 0.5 | 0.25 | 0 | 0 | 0 | 0 | 0 | 0 | 0 |
| $NO_2$ Nitrite ion | ppm | 0 | 0 | 0.1 | 0.2 | 0.5 | 0.5 | 0.1 | 0.05 | 0.05 | 0.05 | 0 | 0 | 0 | 0 | 0 |
| $NO_3$ Nitrate ion | ppm | 0 | 0 | 0 | 5 | 10 | 20 | 10 | 10 | 5 | 5 | 2.5 | 0 | 0 | 0 | 0 |
| PH Alkali/acidity degree | unit | 7.5 | 7.5 | 7.7 | 7.5 | 7 | 7.3 | 7.3 | 7.5 | 7.6 | 8 | 7.7 | 7.9 | 8 | 8 | 8 |
| KH Hardness of carbonate | dKH | 6 | 7 | 7 | 7 | 8 | 6 | 6 | 8 | 10 | 8 | 10 | 12 | 15 | 16 | 16 |
| ORP Oxidation-reduction potential | mvl | 35 | 35 | 40 | 50 | 50 | 38 | 49 | 60 | 100 | 140 | 250 | 280 | 315 | 440 | 445 |
| Ca Calcium ion | ppm | 300 | 300 | 300 | 300 | 300 | 350 | 350 | 300 | 350 | 300 | 300 | 350 | 400 | 550 | 500 |
| Inside anaerobic filter | | | | | | | | | | | | | | | | |
| $O_2$ Saturated amount of dissolved oxygen | mg/l | 14 | 10 | 6 | 2 | 1 | 0 | 0 | 0 | 0 | 0 | 0 | 0 | 0 | 0 | 0 |
| Nitrite ion $NO_2$ | ppm | 0 | 0 | 0 | 0 | 0 | 0.1 | 0.2 | 0.5 | 0.5 | 0.5 | 0.5 | 0.2 | 0.2 | 0.5 | 0.2 |
| Nitrate ion $NO_3$ | ppm | 0 | 0 | 0 | 0 | 5 | 10 | 20 | 30 | 50 | 30 | 10 | 10 | 10 | 10 | 10 |

Experiment 3

When an anaerobic tank is formed in a part of a filtering tank of an over-flow type water tank by using an anaerobic bottom filter body having a size corresponding to ¼ of a bottom area of the water tank and the filtering tank, it has been confirmed that the decomposition of nitrate is required for a somewhat time because of the narrow area of the anaerobic filter but the water quality is stable as shown in Table 3. In this case, commercially available bacteria is used for the formation of the bacteria and 100 damselfishes are used as a fish in the same manner as in Experiment 1.

TABLE 3

Data table(3) Saltwater fish overflow water tank bottom1/4 ryeblock bacteria use

| Day | | 1 | 2 | 3 | 4 | 8 | 10 | 15 | 25 | 35 | 50 | 65 | 80 | 90 | 300 | 720 |
|---|---|---|---|---|---|---|---|---|---|---|---|---|---|---|---|---|
| Inside keeping water tank | | | | | | | | | | | | | | | | |
| $NH_{4+}$ Ammonia ion | ppm | 0.25 | 0.25 | 0.5 | 0 | 0 | 0 | 0 | 0 | 0 | 0 | 0 | 0 | 0 | 0 | 0 |
| $NO_2$ Nitrite ion | ppm | 0.05 | 0.2 | 0.2 | 0.1 | 0 | 0 | 0 | 0 | 0 | 0 | 0 | 0 | 0 | 0 | 0 |
| $NO_3$ Nitrate ion | ppm | 0 | 0 | 2.5 | 5 | 10 | 10 | 15 | 10 | 5 | 2.5 | 0 | 0 | 0 | 0 | 0 |
| PH Alkali/acidity degree | unit | 7.2 | 7.2 | 7.5 | 7.8 | 7.5 | 7.7 | 7.5 | 7.7 | 7.9 | 7.8 | 7.9 | 8 | 8 | 8.1 | 8 |
| KH Hardness of carbonate | dKH | 6 | 6 | 5 | 7 | 6 | 8 | 8 | 7 | 8 | 8 | 8 | 10 | 13 | 15 | 15 |
| ORP Oxidation-reduction potential | mvl | 50 | 50 | 45 | 60 | 65 | 70 | 60 | 80 | 90 | 100 | 80 | 200 | 300 | 445 | 450 |
| Ca Calcium ion | ppm | 300 | 300 | 300 | 300 | 300 | 300 | 300 | 350 | 300 | 350 | 300 | 350 | 400 | 500 | 550 |
| Inside anaerobic filter | | | | | | | | | | | | | | | | |
| $O_2$ Saturated amount of dissolved oxygen | mg/l | 15 | 10 | 5 | 0 | 0 | 0 | 0 | 0 | 0 | 0 | 0 | 0 | 0 | 0 | 0 |
| Nitrite ion $NO_2$ | ppm | 0 | 0 | 0 | 0 | 0 | 0 | 0.1 | 0.2 | 0.5 | 0.5 | 0.5 | 0.5 | 0.2 | 0.5 | 0.2 |
| Nitrate ion $NO_3$ | ppm | 0 | 0 | 0 | 0 | 0 | 5 | 10 | 20 | 20 | 20 | 20 | 10 | 10 | 10 | 10 |

Experiment 4

This experiment is explained with respect to freshwater fishes. In this experiment is selected a fish called as discus. This type of the fish has hitherto been well-known to force frequent water exchange in the breeding, but has characteristics, which are not seen in the other fishes. That is, there are characteristics that a high protein food such as minced meat of raw beef lean meat is firstly required, and the fish is secondly much gluttony in a growth period from a fry to adult, and the formation of bacteria is thirdly slow because water temperature is as high as about 30° C., and the fish is susceptive to water quality and easily destroys its physical condition and the like. Also, an aerobic system is an exterior type wet and dry+upper filter likewise the sea water. In order to maintain pH from neutral to weak acidic state, river sand and Oiso gravel are used as sand. As a result, the system is stood up for about one month and water quality is stable as shown in Table 4.

TABLE 4

Data table(4) Freshwater fish discus bacteria use

| Day | | 1 | 2 | 3 | 4 | 5 | 6 | 7 | 8 | 10 | 15 | 30 | 50 | 90 | 300 | 720 |
|---|---|---|---|---|---|---|---|---|---|---|---|---|---|---|---|---|
| Inside keeping water tank | | | | | | | | | | | | | | | | |
| $NH_{4+}$ Ammonia ion | ppm | 0 | 0.25 | 0.5 | 1 | 0.5 | 0.25 | 0 | 0 | 0 | 0 | 0 | 0 | 0 | 0 | 0 |
| $NO_2$ Nitrite ion | ppm | 0 | 0.05 | 0.1 | 0.2 | 0.2 | 0.1 | 0.05 | 0 | 0 | 0 | 0 | 0 | 0 | 0 | 0 |
| $NO_3$ Nitrate ion | ppm | 0 | 0 | 0 | 2.5 | 5 | 10 | 20 | 10 | 10 | 5 | 2.5 | 0 | 0 | 0 | 0 |
| PH Alkali/acidity degree | unit | 7.2 | 7.2 | 7.2 | 6.8 | 6.5 | 6.5 | 6 | 6.5 | 6.5 | 6.5 | 6.8 | 7 | 7 | 6.9 | 6.5 |
| KH Hardness of carbonate | dKH | 3 | 3 | 5 | 3 | 4 | 4 | 4 | 5 | 7 | 7 | 8 | 8 | 9 | 15 | 15 |
| ORP Oxidation-reduction potential | mvl | 50 | 50 | 60 | 50 | 60 | 60 | 70 | 80 | 120 | 180 | 180 | 250 | 280 | 500 | 565 |
| Inside anaerobic filter | | | | | | | | | | | | | | | | |
| $O_2$ Saturated amount of dissolved oxygen | mg/l | 15 | 10 | 5 | 2 | 0 | 0 | 0 | 0 | 0 | 0 | 0 | 0 | 0 | 0 | 0 |
| Nitrite ion $NO_2$ | ppm | 0 | 0 | 0 | 0 | 0 | 0 | 0.1 | 0.2 | 0.5 | 0.5 | 0.2 | 0.2 | 0.2 | 0.2 | 0.2 |

TABLE 4-continued

Data table(4) Freshwater fish discus bacteria use

| Day | | 1 | 2 | 3 | 4 | 5 | 6 | 7 | 8 | 10 | 15 | 30 | 50 | 90 | 300 | 720 |
|---|---|---|---|---|---|---|---|---|---|---|---|---|---|---|---|---|
| Nitrate ion $NO_3$ | ppm | 0 | 0 | 0 | 2.5 | 5 | 5 | 10 | 20 | 30 | 30 | 30 | 20 | 10 | 10 | 10 |

Experiment 5

In this experiment is used discus. Also, an anaerobic bottom filter body having a size corresponding to ¼ of a bottom area of a water tank and a filtering tank is used. As shown in Table 5, it has been confirmed that water quality is stable though the standing-up of the system is required for a time longer by 2 times than that Experiment 4. From the data of Experiments 4 and 5, it can be judged that the stabilization of water quality is easy with respect to usual fish breeding.

TABLE 5

Data table(5) Freshwater fish discus bacteria use bottom1/4

| Day | | 1 | 3 | 5 | 8 | 12 | 17 | 25 | 35 | 45 | 55 | 70 | 80 | 90 | 300 | 720 |
|---|---|---|---|---|---|---|---|---|---|---|---|---|---|---|---|---|
| Inside keeping water tank | | | | | | | | | | | | | | | | |
| $NH_{4+}$ Ammonia ion | ppm | 0 | 0.25 | 0.5 | 0 | 0 | 0 | 0 | 0 | 0 | 0 | 0 | 0 | 0 | 0 | 0 |
| $NO_2$ Nitrite ion | ppm | 0 | 0.1 | 0.2 | 0 | 0 | 0 | 0 | 0 | 0 | 0 | 0 | 0 | 0 | 0 | 0 |
| $NO_3$ Nitrate ion | ppm | 0 | 0 | 2.5 | 5 | 10 | 10 | 20 | 10 | 5 | 2.5 | 0 | 0 | 0 | 0 | 0 |
| PH Alkali/acidity degree | unit | 7.2 | 7.2 | 6.8 | 6.5 | 6.2 | 6.2 | 6 | 6 | 6.2 | 6.8 | 7 | 7.2 | 7.2 | 6.7 | 6.5 |
| KH Hardness of carbonate | dKH | 3 | 3 | 3 | 4 | 5 | 4 | 5 | 5 | 6 | 7 | 8 | 8 | 9 | 13 | 15 |
| ORP Oxidation-reduction potential | mvl | 50 | 50 | 60 | 60 | 80 | 120 | 180 | 200 | 250 | 250 | 290 | 300 | 315 | 490 | 560 |
| Inside anaerobic filter | | | | | | | | | | | | | | | | |
| $O_2$ Saturated amount of dissolved oxygen | mg/l | 15 | 5 | 2 | 0 | 0 | 0 | 0 | 0 | 0 | 0 | 0 | 0 | 0 | 0 | 0 |
| Nitrite ion $NO_2$ | ppm | 0 | 0 | 0 | 0 | 0.1 | 0.2 | 0.5 | 0.5 | 0.2 | 0.2 | 0.2 | 0.2 | 0.2 | 0.2 | 0.2 |
| Nitrate ion $NO_3$ | ppm | 0 | 0 | 2.5 | 5 | 10 | 20 | 30 | 30 | 20 | 10 | 10 | 10 | 10 | 10 | 10 |

Experiment 6

This experiment is carried out by changing the number of fishes in the water tank P stabilized through 30 days or more, during which inspection for water quality is conducted every 5 days. As seen from the results of Table 6, concentrations of nitrite ion and nitrate ion decrease as the fish number lowers, while the concentrations increase as the fish number increases. And also, it has been confirmed that as the fish number becomes 200, nitrate ion is generated in the water tank P. That is, it can be confirmed that the amount of such ion exceeds an acceptable value. While non-oxygen state inside the water tank P is always inspected and confirmed with a reagent, a filtering amount of the closed type anaerobic filter device 10 and a water flow amount in circulating pathways between the closed type anaerobic filter device 10 and the anaerobic bottom filter body 1 are increased till the arrival to the acceptable value, whereby it is easy to sufficiently take balance.

TABLE 6

| Number of fishes | | 100 | 50 | 10 | 0 | 10 | 50 | 100 | 200 |
|---|---|---|---|---|---|---|---|---|---|
| anaerobic inside filter | $NO_2$ | 0.2 | 0.1 | 0.05 | 0 | 0.5 | 0.1 | 0.2 | 0.5 |
| | $NO_3$ | 10 | 5 | 5 | 0 | 5 | 5 | 10 | 50 |
| Inside keeping water tank | $NO_3$ | 0 | 0 | 0 | 0 | 0 | 0 | 0 | 10 |

(ppm)

As seen from the above experimental results, particularly Tables 1, 2 and 3, calcium ion in sea water gradually increases and is stable in the sea water. Calcium ion is a very important component in the breeding of, for example, coral and shellfishes and is a necessary component in the breeding of seawater creatures.

It is understood from these results to obtain the following effects.

1. A complete water purification can be obtained by decomposing and denitrifying nitrate harmful in the breeding of creatures such as tropical fishes and coral for appreciation and fishes and shellfishes for food and the like in a short time.
2. Since reduced nitrogen is discharged from the breeding water at an isolated state, nitrogen is not dissolved into the breeding water, and particularly the growth of coral, shellfishes, invertebrata and the like can be promoted.
3. It is succeeded to increase calcium ion in sea water, which has never been attained in the conventional technique.
4. The number of water exchange can be decreased as far as possible, and the purification cost can be reduced, and human fatigue and labor through water exchange can be omitted.
5. It is possible to increase bacteria in a short time.
6. It is possible to breed many creatures in the water tank without exchanging water.
7. The occurrence of moss, algae and the like awkward for appreciation can be controlled.
8. The disease contagious disease of creatures can easily be prevented.
9. The water quality can be stabilized.
10. A great amount of anaerobes can be increased and maintained.
11. The damage of creatures in the water tank due to the water exchange can be eliminated.
12. The degree of transparency in the breeding water rises.

INDUSTRIAL APPLICABILITY

As mentioned above, in the purification system according to the invention, the nitrate harmful in the breeding of creatures such as tropical fishes and coral for appreciation and fishes and shellfishes for food and the like can be decomposed and denitrifying-reduced in a short time to provide a complete water purification, so that it is suitable in an appreciation preserve for breeding aquatic creatures mainly consisting of ornamental fishes such as tropical fishes, freshwater fishes and saltwater fishes, or invertebrata, turtle and the like, or a preserve for breeding edible fishes and shellfishes.

What is claimed is:

1. A water purification system through denitrifying reduction with faculative anaerobes, comprising an aerobic circulating pathway for aerobic treatment of water through a filter using aerobic bacteria in which nitrate is produced;

an anaerobic circulating pathway for anaerobic treatment of water through a filter using anaerobic bacteria, said anaerobic circulating pathway comprising a box anaerobic bottom filter body comprising a draining board upper plate part including a plurality of holes, a pair of shower pipes positioned for drainage and discharge inside said bottom filter body at opposed opposite ends of said filter body, each of said pair of shower pipes having a longitudinal direction and connected at an opening end side to a closed anaerobic filter device, and containing a plurality of jetting holes in the longitudinal direction, said bottom filter body capable of being arranged on a bottom part of a water tank for breeding aquatic creatures;

powdery sand or a water-permeable and oxygen-impermeable screen member separating said aerobic circulating pathway and said anaerobic circulating pathway with said aerobic circulating pathway and said anaerobic circulating pathway being separately arranged so that nitrate produced in said aerobic circulating pathway is exuded into said anaerobic circulating pathway through said powdery sand or a water-permeable and oxygen-impermeable screen member, and the nitrate is decomposed in said anaerobic circulating pathway separately arranged from said aerobic circulating pathway; and said powdery sand or water-permeable and oxygen-impermeable screen member is placed on an upper face of said draining board upper plate part of the anaerobic bottom filter body, and water existing inside the anaerobic bottom filter body is capable of being circulated through the closed anaerobic filter device to conduct reducing treatment and contacted with said powdery sand or screen member located on the upper face of the draining board upper plate part through the plurality of holes.

2. The water purification system through denitrifying reduction with faculative anaerobes according to claim 1, wherein a nitrogen gas produced when the nitrate is decomposed in the anaerobic circulating pathway is discharged at a state of isolating so as not to contact with water in the aerobic circulating pathway.

3. The water purification system through denitrifying reduction with faculative anaerobes according to claim 1, in combination with a water tank, and said bottom filter body is arranged on a bottom part of a water tank for breeding aquatic creatures.

4. A water purification system through denitrifying reduction with faculative anaerobes, comprising an aerobic circulating pathway for aerobic treatment of water through a filter using aerobic bacteria in which nitrate is produced;

an anaerobic circulating pathway for anaerobic treatment of water through a filter using anaerobic bacteria, said anaerobic circulating pathway comprising a box anaerobic bottom filter body comprising a draining board upper plate part including a plurality of holes, a pair of shower pipes positioned for drainage and discharge inside said bottom filter body at opposed opposite ends of said filter body, each of said pair of shower pipes having a longitudinal direction and connected at an opening end side to a closed anaerobic filter device, and containing a plurality of jetting holes in the longitudinal direction, said bottom filter body capable of being arranged on an inner bottom part of a water chamber adjacent to an aerobic filtering tank arranged outside a water tank for breeding aquatic creatures or at a bottom side of the aerobic filtering tank;

powdery sand or a water-permeable and oxygen-impermeable screen member separating said aerobic circulating pathway and said anaerobic circulating pathway with said aerobic circulating pathway and said anaerobic circulating pathway being separately arranged so that nitrate produced in said aerobic circulating pathway is exuded into said anaerobic circulating pathway through said powdery sand or a water-permeable and oxygen-impermeable screen member, and the nitrate is decomposed in said anaerobic circulating pathway separately arranged from said aerobic circulating pathway; and said powdery sand or water-permeable and oxygen-impermeable screen member placed on an upper face of said draining board upper plate part of the anaerobic bottom filter body, and water existing inside the anaerobic bottom filter body is capable of being circulated through the closed anaerobic filter device to conduct reducing treatment and contacted with said powdery sand or screen member located on the upper face of the draining board upper plate part through the plurality of holes.

5. The water purification system through denitrifying reduction with faculative anaerobes according to claim 4, wherein a nitrogen gas produced when the nitrate is decomposed in the anaerobic circulating pathway is discharged at a state of isolating so as not to contact with water in the aerobic circulating pathway.

6. A water purification system through denitrifying reduction with faculative anaerobes, comprising
- an aerobic circulating pathway for aerobic treatment of water through a filter using aerobic bacteria in which nitrate is produced;
- an anaerobic circulating pathway for anaerobic treatment of water through a filter using anaerobic bacteria, said anaerobic circulating pathway including a cylindrical exuding hollow body comprising a pipe including a side face containing holes covered with a net member arranged in the anaerobic circulating pathway, and the cylindrical exuding hollow body is positioned in the bottom of a water tank as an anaerobic bottom filter body; and
- sand or a water-permeable and oxygen-impermeable screen member separating said aerobic circulating pathway and said anaerobic circulating pathway with said aerobic circulating pathway and said anaerobic circulating pathway being separately arranged so that nitrate produced in said aerobic circulating pathway is exuded into said anaerobic circulating pathway through said sand or a water-permeable and oxygen-impermeable screen member, and the nitrate is decomposed in said anaerobic circulating pathway separately arranged from said aerobic circulating pathway.

7. The water purification system through denitrifying reduction with faculative anaerobes according to claim 6, wherein a nitrogen gas produced when the nitrate is decomposed in the anaerobic circulating pathway is discharged at a state of isolating so as not to contact with water in the aerobic circulating pathway.

8. A water purification system through denitrifying reduction with faculative anaerobes, comprising
- an aerobic circulating pathway for aerobic treatment of water through a filter using aerobic bacteria in which nitrate is produced;
- an anaerobic circulating pathway for anaerobic treatment of water through a filter using anaerobic bacteria;
- sand or a water-permeable and oxygen-impermeable screen member separating said aerobic circulating pathway and said anaerobic circulating pathway with said aerobic circulating pathway and said anaerobic circulating pathway being separately arranged so that nitrate produced in said aerobic circulating pathway is exuded into said anaerobic circulating pathway through said sand or a water-permeable and oxygen-impermeable screen member, and the nitrate is decomposed in said anaerobic circulating pathway separately arranged from said aerobic circulating pathway; and
- a pair of cylindrical exuding hollow bodies each comprising a pipe including a side face containing holes covered with a net member, said pair of cylindrical exuding hollow bodies arranged on upper and lower sides of a closed box as an upper cylindrical exuding body and a lower cylindrical exuding body, powdery sand filling an inside of the closed box, and said upper cylindrical exuding body comprising part of said aerobic circulating pathway, and said lower cylindrical exuding body comprising part of said anaerobic circulating pathway.

9. The water purification system through denitrifying reduction with faculative anaerobes according to claim 8, wherein a nitrogen gas produced when the nitrate is decomposed in the anaerobic circulating pathway is discharged at a state of isolating so as not to contact with water in the aerobic circulating pathway.

* * * * *